United States Patent
Yan

(10) Patent No.: US 10,362,129 B2
(45) Date of Patent: Jul. 23, 2019

(54) OPTIMIZING VALUE OF CONTENT ITEMS DELIVERED FOR A CONTENT PROVIDER

(71) Applicant: Facebook, Inc., Menlo Park, CA (US)

(72) Inventor: Jinghao Yan, Cupertino, CA (US)

(73) Assignee: Facebook, Inc., Menlo Park, CA (US)

( * ) Notice: Subject to any disclaimer, the term of this patent is extended or adjusted under 35 U.S.C. 154(b) by 39 days.

(21) Appl. No.: 15/412,778

(22) Filed: Jan. 23, 2017

(65) Prior Publication Data

US 2018/0212890 A1   Jul. 26, 2018

(51) Int. Cl.
*H04L 29/08* (2006.01)

(52) U.S. Cl.
CPC ................... *H04L 67/22* (2013.01)

(58) Field of Classification Search
CPC .................................... H04L 67/327
See application file for complete search history.

(56) References Cited

U.S. PATENT DOCUMENTS

| 9,183,259 | B1* | 11/2015 | Marra | G06F 17/30867 |
| 9,904,949 | B1* | 2/2018 | Tavernier | G06Q 30/0631 |
| 2009/0248511 | A1* | 10/2009 | Mehta | G06Q 30/02 705/14.54 |
| 2009/0307081 | A1* | 12/2009 | Rabbit | G06Q 30/02 705/14.42 |
| 2009/0327030 | A1* | 12/2009 | Collins | G06Q 30/02 705/14.43 |
| 2012/0047201 | A1* | 2/2012 | Jain | H04N 21/26225 709/203 |

* cited by examiner

*Primary Examiner* — Kevin M Cunningham

(74) *Attorney, Agent, or Firm* — Fenwick & West LLP

(57) ABSTRACT

An online system receives content items from content providers and delivers the content items to client devices of users. The online system receives a weight associated with an item described in the content item. The online system determines a rate at which a content item is delivered to users based on the received weight associated with the item and a rate at which users interact with the content item. The online system delivers the content item to users at the rate determined based on the received weight and the rate at which users interact with the content item. The online system may periodically adjust the rate of delivery of the content item based on the rate at which users interact with the content item.

22 Claims, 3 Drawing Sheets

OPTIMIZING VALUE OF CONTENT ITEMS DELIVERED FOR A CONTENT PROVIDER

BACKGROUND

This disclosure relates in general to delivery of content, and in particular, to optimizing value of content items delivered by an online system for a content provider.

An online system receives content items from content providers and distributes them to users of the online system. The online system provides value to the content providers by distributing the content items to the users. Content providers provide guidance indicating how the online system should distribute the content items. For example, the content provider may provide information describing the demographics of users to target for a content item or specify a rate at which content items should be distributed.

The overall value to the content provider of distribution of content items to users by the online system may depend on various factors. For example, the value of distribution of content items to the content provider may depend on the types of user interactions performed by the users responsive to receiving the content items. The online system determines which content items to provide to a user or rate of delivery of a content item based on whether users might perform the user interactions, but this fails to consider the various factors that affect the value provided to the content provider associated with those user interactions. Therefore, conventional systems often fail to maximize the value provided to the content providers by distributing the content items.

SUMMARY

An online system receives content items from a content provider system and delivers the content items to users. The online system delivers each content item at a rate that maximizes the value of the distributed content items to the content provider system. The online system receives information describing an item associated with a content item. For example, the online system receives a weight indicative of a value of the item associated with the content item. The online system monitors a rate at which the users perform actions associated with the content item. For example, the user actions may represent a user accessing the content item, sharing the content item, interacting with a website associated with the content provider, and so on. The online system determines a rate of delivery of the content item based on factors including the weight indicative of a value of the item associated with the content item and the monitored user actions associated with the content item. The online system distributes the content items based on the determined rate. Accordingly, a content item associated with a high value item may be distributed at a higher rate than a content item associated with a low value item if the monitored rate of user interactions for the two items is same.

In an embodiment, the online system identifies a particular user and a plurality of content items as candidates to be delivered to the user. The online system determines a score for each of the plurality of content items based on the weight assigned to an item associated with the content item and the monitored rate of interaction of users with the content item. The online system selects a content item from the plurality based on the scores and delivers the selected content item to the user. The online system optimizes the value provided to the content provider by delivering the content items at a rate that weighs a content item based on the value of the item associated with the content item.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overall System Environment

Figure 1:
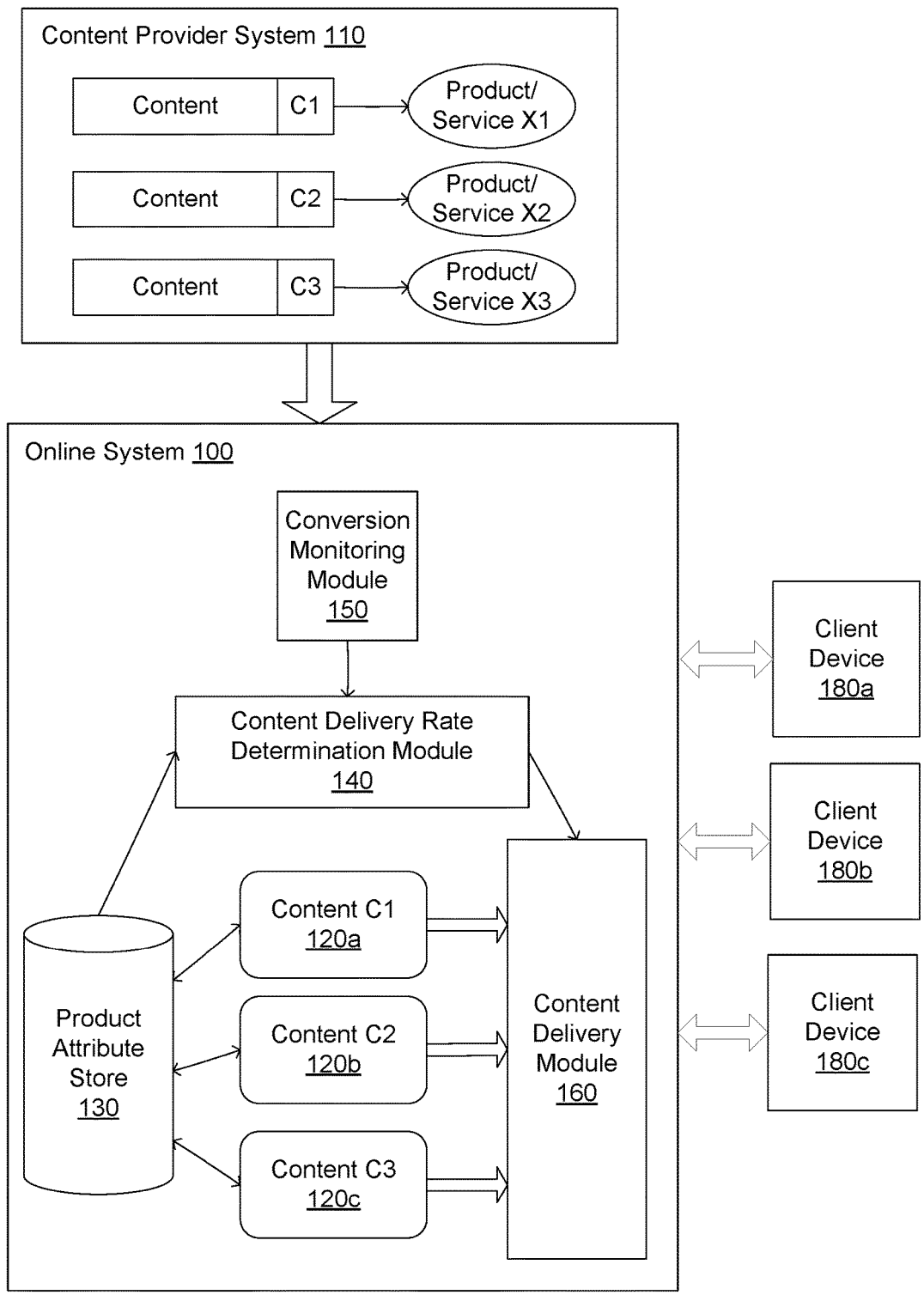
FIG. 1 shows a system environment illustrating the interactions between an online system, a content provider system, and one or more client devices, according to an embodiment.

FIG. 1 shows a system environment illustrating the interactions between an online system 100, a content provider system 110, and one or more client devices 180, according to an embodiment. In some embodiments, the various components of the system environment interact with each other over a network. In various embodiments, each of the online system 100, content provider system 110, and client devices 180 may include additional, fewer, or different components for various applications. Conventional components such as network interfaces, security functions, load balancers, failover servers, management and network operations consoles, and the like are not shown so as to not obscure the details of the system architecture.

FIG. 1 and the other figures use like reference numerals to identify like elements. A letter after a reference numeral, such as "120a," indicates that the text refers specifically to the element having that particular reference numeral. A reference numeral in the text without a following letter, such as "120," refers to any or all of the elements in the figures bearing that reference numeral, e.g., "120" in the text refers to reference numerals "120a" and/or "120b" in the figures.

A client device 180 is a computing device configured to receive user input as well as transmitting and/or receiving data via a network. In one embodiment, the client device 180 is a conventional computer system, such as a desktop or laptop computer. Alternatively, a client device 180 may be a device having computer functionality, such as a personal digital assistant (PDA), a mobile telephone, a smartphone or another suitable device. In one embodiment, a client device 180 executes an application allowing a user of the client device 180 to interact with the online system 100. For example, a client device 180 executes a browser application (also referred to as a browser) to enable interaction between the client device 180 and the online system 100 via a network. In another embodiment, a client device 180 interacts with the online system 100 through an application programming interface (API) running on a native operating system of the client device 180, such as IOS® or ANDROID™.

A client device 180 may be configured to communicate via a network, which may comprise any combination of local area and/or wide area networks, using both wired and/or wireless communication systems. In one embodiment, the network uses standard communications technologies and/or protocols. For example, the network includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network may be encrypted using any suitable technique or techniques.

The content provider system 110 stores content related to items. An item may be a physical object, for example, a product such as a car, phone, equipment, and so on. Alternatively, an item may be an intangible entity, for example, a service, such as a vacation, a phone service, and so on. The content item may display the item, mention the item, or describe the item. The content item is provided for display to users of client devices 180. According to an embodiment, the content provider system 110 additionally includes specific information about the products and services. For example, the content provider system 110 may maintain a data feed with information about the products and services.

The online system 100 sends for display, content obtained from the content provider system 110 to users of the online system via a client application executing on the client devices 180 of the users. According to one embodiment, the online system 100 is a social networking system. The online system 100 comprises a conversion monitoring module 150, a content delivery rate determination module 140, a product attribute store 130, content 120, and a content delivery module 160. In some embodiments, the online system 100 further comprises a web server, though such a component is not illustrated in FIG. 1.

A content item may be a sponsored content item, for example, an advertisement that is presented by the online system 100 to users of the online system 100 on behalf of a content provider system 110. Accordingly, the content provider system 110 provides remuneration to the online system 100 for distributing the content item. The remuneration for a content item may be determined based on various criteria, for example, the size of the content item, the position within a user interface at which the content item is presented, the time at which the content item is presented to a user, and so on. In an embodiment, the content provider system 110 provides remuneration for each instance of display of the content item to a user by the online system 100, also referred to as an impression.

The online system 100 receives content 120 (also sometimes referred to herein as "content item") and information about products or services related to the content from the content provider system 110. According to an embodiment, the online system 100 receives a data feed of the content provider system 110 which itemizes various attributes of each product or service and is typically kept updated. The content 120 and the information about products or services related to the content are stored in the product attribute store 130. The product attribute store 130 includes one or more attributes that specify a value associated with the product or service. For example, product attribute store 130 may store an attribute indicating a cost of purchasing the product or service, a profit margin associated with the product or service, or a weight value that is proportionate to the value of the product or service.

In various embodiments, the content 120 may take the form of text, images, video, audio, or another suitable format for displaying information about a product or service to users via the client devices 180.

The conversion monitoring module 150 detects when users complete an action in response to receiving the content 120 at a client device 180 (i.e. the display of content has been "converted" into a specific user action). One example of a conversion includes a user purchasing a product displayed in the content after clicking on the content after the online system sent the content for display on the user's client device 180. Based on the detected conversions, the conversion monitoring module 150 outputs a conversion rate which represents the ratio of completed conversions out of the total number of times the content was displayed to a user on a client device 180. In some embodiments, the conversion monitoring module 150 monitors other aspects of user interactions with the content on the client devices 180, such as click through rate (CTR), which is the ratio of the number of times the content 120 is clicked on by users to the total number of times the content was displayed to users on their client devices 180. In another embodiment, the conversion monitoring module 150 monitors a user registering with a system associated with a content provider responsive to being presented with the content received from the content provider.

The content delivery rate determination module 140 uses attribute values from the product attribute store 130 and the conversion monitoring module 150 to determine a rate at which each content item 120 is subsequently displayed to users. According to some embodiments, the content delivery rate determination module 140 also determines which content items should be sent for display to a user if multiple content items are available for display on the client devices 180. The content delivery rate determination module 140 is described in more detail with respect to FIG. 2.

The content delivery module 160 receives information from the content delivery rate determination module 140, indicating which content 120 should be displayed to users and a rate at which the content 120 should be sent for display to users. The content delivery module 160 obtains the specified content 120 from the product attribute store, formats it for display on the client devices 180, and provides the content 120 to the client devices 180.

System Architecture

Figure 2:
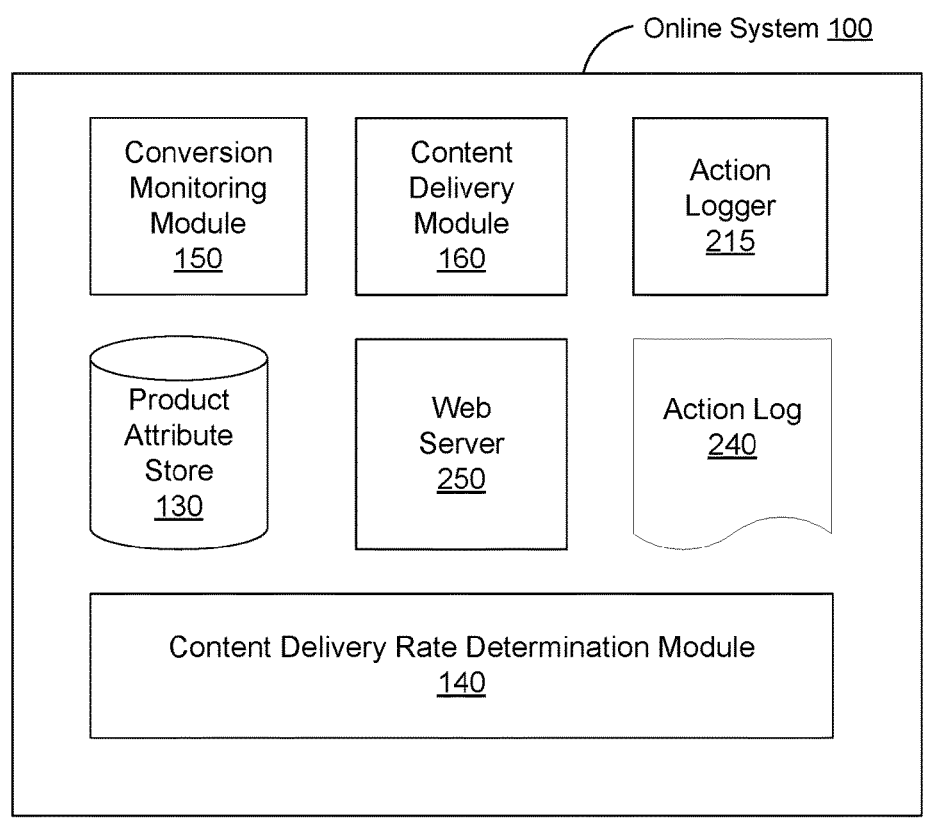
FIG. 2 is a block diagram illustrating the system architecture of an online system for determining a rate of content delivery, according to an embodiment.

FIG. 2 is a block diagram illustrating the system architecture of the online system 100 for determining a rate of content delivery, according to an embodiment. The online system 100 comprises the conversion monitoring module 150, the content delivery module 160, an action logger 215, an action log 240, a web server 250, the product attribute store 130, and the content delivery rate determination module 140.

The conversion monitoring module 150 monitors user interactions on the client devices 180 to determine a rate at which users interact with the content 120 when it is displayed on the client devices 180. In various embodiments, rates of different types of user interactions are determined. Typically, the monitored rates relate to conversions, that is, actions that are completed by users in response to receiving the content 120. In one embodiment, the conversion rate tracked is the rate at which users purchase products or services after viewing or interacting with the content 120 that is related to those products or services. In another example, the conversion monitoring module 150 keeps track of the "click through rate" (CTR), representing the rate at which users presented with a content item 120 click on the content item 120. In another example, the conversion monitoring module 150 tracks a rate at which users presented with a content item 120 click on a link associated with the content provider of the content item 120 after viewing the content item. In another example, the conversion monitoring module 150 tracks a rate at which users presented with a content item 120 register with a website associated with the content provider of the content item 120 after viewing the content item.

In one embodiment, the conversion monitoring module 150 uses a tracking pixel or piece of HTML code placed by the content provider system 110 on third-party websites to monitor users visiting the websites that have not opted out of tracking. A tracking pixel might be included on various pages, including on a product page describing a product, on a shopping cart page that the user visits upon putting something into a shopping cart, on a checkout page that the user visits to checkout and purchase a product, etc. For example, a tracking pixel results in a transparent 1×1 image, an iframe, or other suitable object being created for third party pages. When a user's browser loads a page having the tracking pixel, the tracking pixel results in the user's browser attempting to retrieve the content for that pixel, and the browser contacts the online system 100 to retrieve the content. The request sent to the online system 100, however, actually includes various data about the user's actions taken on the third party website. The third party website can control what data is sent to the online system 100. For example, information may be included about a page the user is loading (e.g., is it a product page, a shopping cart page, a checkout page, etc.), about information on the page or about a product on the page of interest to the user (e.g., the SKU number of the product, the color, the size, the style, the current price, any discounts offered, the number of products requested, etc.), about the user (e.g., the third party's user identifier (UID) for the user, contact information for the user, etc.), and other data. In some embodiments, a cookie set by the online system 100 can also be retrieved by the online system 100, which can include various data about the user, such as the online systems' UID for the user, information about the client device and the browser, such as the Internet Protocol (IP) address of the client device, among other data. Tracking can also be performed on mobile applications of content providers by using a software development kit (SDK) of the online system 100 or via an application programming interface (API) of the online system 100 to track events (e.g., purchases) that occur by users on the content provider's app that are reported to the online system 100.

The online system 100 can then use this data received about the user to serve better content to the user in the future (e.g., since the online system has further data about products purchased or browsed that might be of interest), and can also use this in retargeting of that product to the user (e.g., where the user went to the product page on a third party site by clicking on content from the content provider system 110 presented to the user in the online system 100). The online system 100 can also use this data in conversion tracking and reporting results of advertising campaigns to the content provider system 110. For example, if the content provider system 110 has spent money at the online system 100 to have the online system 100 serve content (e.g., ads for its products), and a particular user views content on the online system 100 and then purchases a product advertised in the content (possibly at some point later, and possibly on a different device), the online system 100 can link the purchase/conversion to the content originally shown on the online system 100. Thus, the online system 100 can include this data in its reporting to the content provider system 110 of how many conversions the content campaign received.

In an embodiment, the online system 100 is a social networking system that allows users to create connections with other users and interact with other users. Accordingly, the online system 100 may track rates of various user interactions such as a user commenting on a content item, a user liking a content item, a user sharing the content item with other users, and so on. In an embodiment, the online system determines an aggregate rate of user interactions with the content item by weighing different types of content items differently. For example, a conversion representing a purchase of an item described in a content item is weighted more than a conversion representing clicking on the content item. Similarly, a conversion representing a user registering in a web site of a content provider of a content item is weighted more than a conversion representing clicking on the content item. In an embodiment, the content provider provides weights representing different conversions. For example, a content provider may be interested in increasing the number of users registered on their website and may accordingly weight registering with the web site higher than other types of user interactions. As another example, the content provider may provide (e.g., in the data feed described above) a weight for each product or service indicating the value to the content provider of a conversion occurring on that product/service. As a further example, the online system can itself determine weights of different products/services based information provided by the content provider (e.g., in the data feed) about each of the products/services, such as the price, the profit margin, etc.

The content delivery module 160 delivers content items to client devices 180 to be presented to a user. Content items eligible for presentation to users are retrieved from the product attribute store 130 or from another source by the content delivery module 160, which selects one or more of the content items for presentation to the user. The content delivery module 160 selects which content to deliver to a client device 180 based on the rates provided by the content delivery rate determination module 140, which indicate a number of times a content item 120 should be shown to users within a time interval having a particular length.

In an embodiment, the content delivery module 160 identifies a plurality of content items as potential candidate content items for delivery to a user. The content delivery module 160 determines a score value for each potential candidate content item based on the attribute representing the value of the item described in the content item and the monitored rate of user interactions with the content item. The content delivery module 160 selects the content item with the highest score and delivers the content item to the user. In an embodiment, various of the plurality of content items identified as potential candidate content items are received from the same content provider. As one example, the content items can be dynamic content items in which the system selects from various options which product or service to include in the content item from multiple options by the content provider. Thus, selecting a content item can include dynamically selecting products/services and other information to include in the content item from among options.

The online system 100 selects the content item that maximizes the value for the content provider and delivers the selected content item to the user. For example, the content delivery module 160 can select the content item that will provide the content provider with the highest return on the content provider's investment or spend on presenting that content item. However, instead of just considering the likelihood of the user converting on the content item when deciding what content item to select for the user, the system also considers the value of the content item as indicated by the weight (e.g., weighted by price, by profit margin, or by some other measure of revenue to the content provider) to automatically optimize for best return on content item spend. Thus, for every impression opportunity by various users, the system selects the content item of various content items from various content providers that will provide the highest return to the content provider system 110 as determined by considering the likelihood of that user converting on that particular content item along with the weight indicating the value of the product/service in the content item.

In one embodiment, the content delivery module 160 applies machine learning techniques to generate a model that when applied to a set of content items, can select the optimal content item or set of content items that will provide the content provider with the highest return on the content provider's investment or spend on presenting that content item to a particular user or group of users. As part of the generation of the model, the content delivery module 160 forms a training set of content items by identifying a positive training set of content items that have been determined to have high content delivery rates and high weights in proportion to a corresponding investment or spend contributed by the content provider, as is calculated for campaigns by the delivery rate determination module 140, details of which are explained below. In some embodiments, a negative training set of content items that lack high content delivery rates and high weights in proportion to a corresponding investment or spend contributed by the content provider is also determined.

The content delivery module 160 extracts feature values from the content items of the training set, the features being variables deemed potentially relevant to whether or not the content items have the associated high delivery rates and weights in proportion to corresponding investments. An ordered list of the features for a content item is herein referred to as the feature vector for the content item. In one embodiment, the content delivery module applies dimensionality reduction (e.g., via linear discriminant analysis (LDA), principle component analysis (PCA), or the like) to reduce the amount of data in the feature vectors for content items to a smaller, more representative set of data.

The content delivery module 160 uses supervised machine learning to train the model with the feature vectors of the positive training set and the negative training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments that make use of a machine learned model. The model, when applied to the feature vector extracted from a content item, outputs an indication of whether the content item has the property in question, such as a Boolean yes/no estimate, or a scalar value representing a probability.

In some embodiments, a validation set is formed of additional content items, other than those in the training set, which have already been determined to have or to lack a good proportion of weighted delivery rates in proportion to investments. The content deliver module 160 applies the trained validation model to the content items of the validation set to quantify the accuracy of the model. Common metrics applied in accuracy measurement include: Precision=TP/(TP+FP) and Recall=TP/(TP+FN), where precision is how many the model correctly predicted (TP or true positives) out of the total it predicted (TP+FP or false positives), and recall is how many the model correctly predicted (TP) out of the total number of content items that did have the property in question (TP+FN or false negatives). The F score (F-score=2*PR/(P+R)) unifies precision and recall into a single measure. In one embodiment, the content delivery module 160 iteratively re-trains the model until the occurrence of a stopping condition, such as the accuracy measurement indication that the model is sufficiently accurate, or a number of training rounds having taken place.

The action logger 215 receives communications about user actions internal to and/or external to the online system 100, populating the action log 240 with information about user actions. Examples of actions include clicking on links, sending a message to another user, uploading an image, reading a message from another user, and interacting with content 120.

The action log 240 may be used by the online system 100 to track user actions on the online system 100, as well as to track actions on third party systems that communicate information to the online system 100. Users may interact with various objects on the online system 100, and information describing these interactions is stored in the action log 240. Examples of interactions with objects include: commenting on posts, sharing links, checking-in to physical locations via a client device 180, interacting with content items 120, and any other suitable interactions.

In some embodiments, the online system includes a web server 250. The web server 250 receives and processes requests by configuring a web page for sending to the client device 180 that requested the web page. The web server 250 includes content 120 in the web page if the content delivery module 160 has determined that the content 120 should be displayed to users. The web server 250 sends the configured web page for presentation via a browser of the client device 180. The browser of the client device 180 receives the web page and renders the web page for presentation via a display screen of the client device 180.

The web server 250 further receives information describing user actions performed with the online system 100 by users via client applications on a client device 180. In some embodiments, the web server 250 stores information describing user actions in the action log 240 or in another suitable location in memory.

The product attribute store 130 stores attributes about products or services provided by the content provider system 110. In some embodiments, the product attribute store 130 also stores content items 120 provided by the content provider system 110 and additional data that may be required by the online system 100. According to an embodiment, the attributes kept in the product attribute store 130 are received via a data feed that lists updated product information. For example, a data feed could include information about a set of products and services for which the content provider system 110 has provided content to the online system 100 which is retrieved on a recurring basis from a catalog that is maintained by the content provider system 110 according to some prescribed schedule or uploaded from the product catalog by the content provider system 110. Attributes stored in the product attribute store 130 could include information such as price, profit margin, product condition, manufacturer identification numbers, and any other data the content provider system 110 chooses to provide to the online system 100. In some embodiments attributes about products and services that are provided to the online system 100 come from a source other than the content provider system 110. For example, an entity selling the products or service could provide a data feed directly to the online system 100, but contract out the creation of promotional materials to a separate entity that acts as the content provider 110, providing promotional content that is related to the products or services to the online system 100.

The content delivery rate determination module 140 determines the rate at which a content item 120 received from a content provider system 110 should be provided to users. In some embodiments, the content delivery rate determination module 140 determines whether specific content should be shown to users. According to an embodiment, the rates are determined in order to optimize a return on advertisement spend (ROAS) value for the content provider system 110. The ROAS is defined as a sum of revenue from a campaign divided by a sum of the total cost of advertising (i.e. providing content) for the campaign. That is, the ROAS may be expressed by:

$$ROAS = \frac{\sum_i w_i}{C} \quad (1)$$

where i is the number of conversions over the course of a campaign, $w_i$ is a weight value associated with a content item involved in an ith conversion, and C is the total cost of advertising for the campaign.

The content delivery rate determination module 140 uses data from the product attribute store 130 and the conversion monitoring module 150 as inputs for its calculations. Product attribute values represent weights (i.e. factors) that indicate a relative significance by which each item of content should be weighted. For example, the price of the product or service associated with the content may be used as the weight factor in the rate determination calculations. Consequently, in some embodiments, the online system 100 determines higher rates at which to display content that describes more expensive products or services in order to optimize the ROAS.

In an embodiment, the content delivery rate determination module 140 determines the rate at which a content item is delivered to users as a value that is directly related to an attribute representing the value of the product or service described in the content item as well as directly related to a rate at which users interact with the content item. In an embodiment, the content delivery rate determination module 140 determines the rate at which a content item is delivered to users as a value that is proportionate to an attribute representing the value of the product or service described in the content item as well as proportionate to a rate at which users interact with the content item.

According to an embodiment, the content delivery rate determination module 140 multiplies the conversion rate (i.e. the rate at which users take some specified action in response to receiving the content) by the weight (e.g. price) of the product or service that is represented in the content. The product of this calculation is multiplied by some predetermined factor and the rate at which the content related to the product or service should be delivered to users is determined based on the result of the calculation.

In another embodiment, the members of a set of potential content items 120 are considered together. For each member of the set, a weight, representing a value of a product attribute, is multiplied by the conversion rate associated with the content that describes the particular product or service. The content delivery rate determination module 140 then suggests relative rates at which each of these content items 120 should be presented to the users. That is, for the total content space that the content delivery module 160 has allocated for that set of potential content items 120 to be shown to users, the content delivery rate determination module 140 determines what percent of the total space should be used to present each content item 120 in the set to users based on the relative values of the weighting calculations.

In another embodiment, the members of a set of potential content items 120 are considered together. For each member of the set, a weight, representing a value of a product attribute, is multiplied by the conversion rate associated with the relevant content 120. The content delivery rate determination module then selects the content 120 whose calculation has the largest product, and suggests to the content delivery module a rate at which only that particular content item 120 should be provided to users.

According to an embodiment, the members of some set of potential content items 120 are considered together. The content delivery rate determination module 140 additionally acquires data about the amount of money that the content provider spent on each content item 120 (e.g. a fee charged by the online system 100 to present the content 120 to users for the content provider 110) over the time period during which the conversion rate provided by the conversion monitoring module 150 was determined. For each member of the set, the conversion rate is multiplied by the weighting factor and divided by the amount of money that was spent on the content. Several ways in which the content delivery rate determination module 140 may subsequently use these values to determine a rate at which the content 120 should be provided to users are here detailed.

In one embodiment, the content delivery rate determination module 140 uses the values to assign a relative rate at which each of the members of the set of potential content items 120 under consideration should be presented within a shared allotment of content space as managed by the content delivery module 160.

In another embodiment, the content delivery rate determination module 140 chooses the content 120 with the largest of the associated values and provides the content delivery module 160 with a rate at which that particular content item 120 should be displayed to users.

In another embodiment, the content provider system 110 provides a preferred target ROAS value to the online system. The content delivery rate determination module 140 can then use the values calculated using the weighting values, conversion rates, and cost of providing content 120, for each member of the set of potential content 120 to display to users to choose the optimal rates at which each potential content item 120 should be displayed to users. The content delivery rate determination module 140 creates a model or a system of equations with which it is able to simultaneously determine rates at which each potential content item 120 should be displayed to the users such that the sum of the rate-value products is equal to the preferred ROAS value.

In some embodiments, the conversion monitoring module 150 can monitor conversion rates associated with individual users, or groups of similar users. In this case, the content delivery rate determination module uses the conversion data about an individual to calculate a rate at which the content delivery module 160 should provide the content 120 to that particular user.

Overall Process

Figure 3:
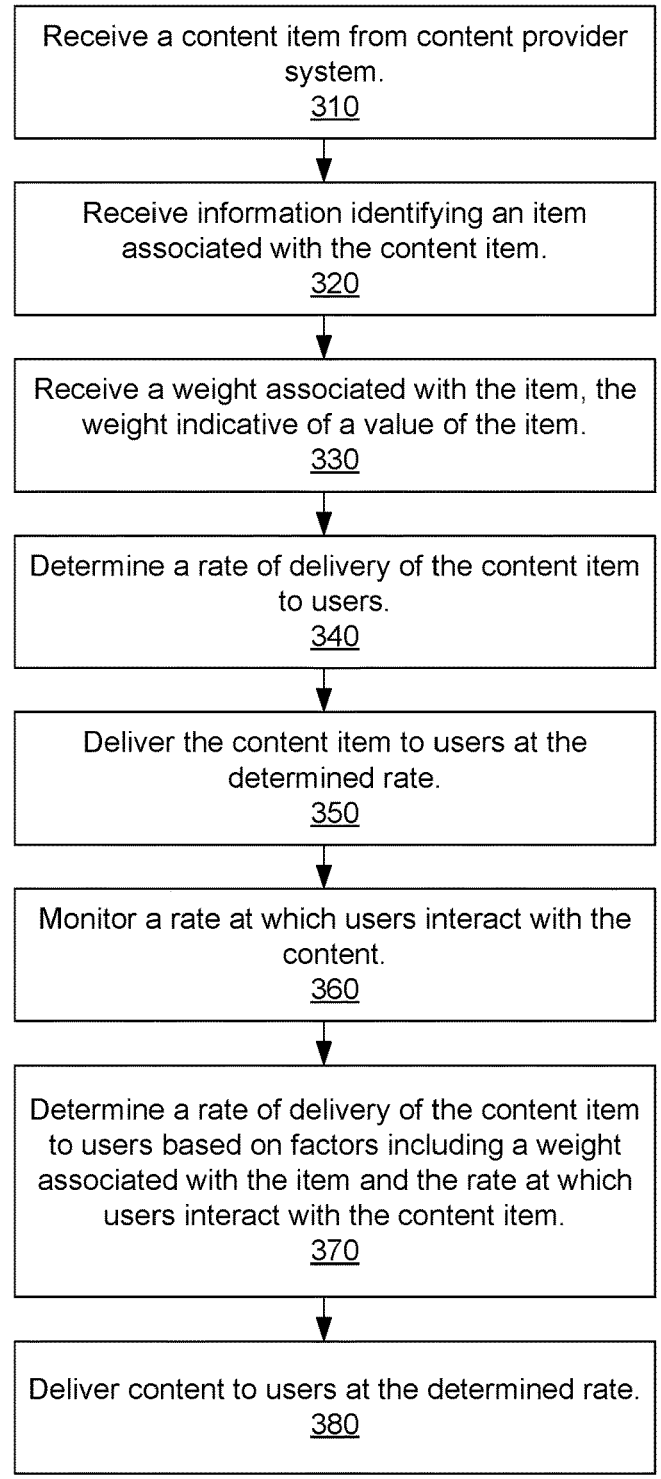
FIG. 3 is a flowchart illustrating the process of determining a rate at which to deliver a content item to a user, and delivering the content item, according to an embodiment.

FIG. 3 is a flowchart illustrating the process of determining a rate at which to deliver a content item to a user, and delivering the content item, according to an embodiment. The steps illustrated in FIG. 3 may be executed in an order different from that indicated in FIG. 3. Furthermore, the steps may be executed by modules different from the modules indicated herein.

The online system receives 310 a content item 120 from the content provider system 110. In various embodiments, the content 120 may take the form of text, images, video, audio, or another suitable format for displaying information about an item, for example, a product or service to users via the client devices 180.

The online system 100 receives 320 information identifying an item (e.g. product or service) associated with the content item 120. For example, the online system might receive the price of a product or service or information about the cost of providing content 120 about the product or service to client devices 180. In one embodiment, the information identifying the item associated with the content item 120 is sent from the content provider system 110. In another embodiment, the information identifying the item associated with the content item 120 may be received from a different system.

The online system receives 330 a weight associated with the item. The weight is a factor that indicates the value of the item. For example, the content provider (or another system with information about the item) could provide the price of the product to be used as a weight value. This weight can be received 330 by the content provider system 110 providing the weight to the system, or it can be received 330 in that the online system 100 determines the weight based on information provided by the content provider system 110 (e.g., price, profit margin, other revenue measures, etc.).

After receiving various data about products or services and about content related to those products or services, the online system 100 determines 340 a rate at which the content item 120 should be initially delivered to users and delivers 350 the content item 120 to the users at the determined rate. An initial rate for distributing the content 120 is used to gather preliminary data about responses and interactions users have with the content. For example, the content delivery module 160 may deliver the content item 120 to users at a predetermined rate to gather preliminary data about how many users perform a user interaction representing a conversion (for example, by purchasing the product) after receiving the content 120. The data about users interacting with the content is collected and used to provide the content 120 at a rate determined by the content delivery rate determination module 140. In one embodiment, the online system 100 determines the rate at which the online system 100 initially delivers the content to users by assigning a predetermined rate value to all content 120.

The online system 100 monitors 360 the rate at which users interact with the content 120. The conversion monitoring module 150 keeps track of how many users perform a specific action in response to receiving the content 120. For example, the conversion monitoring module 150 might keep track of how many users navigated to the order confirmation web page for purchasing the product with which the content 120 is associated after clicking on the content 120. In this way, the online system 100 obtains rates indicating how many users who receive the content 120 subsequently perform an action.

The online system 100 uses the collected data to determine 370 a rate at which the content 120 should be delivered to the user based on factors including a weight associated with the product or service and the rate at which the users have been observed performing specific actions that are related to the product or service displayed in the content 120. In some embodiments, the rate determination additionally incorporates other information about the product or service such as the price of providing each content item 120 to users via the online system 100. The rate determination is performed by the content delivery rate determination module 140. The determination is provided to the content delivery system 160, which delivers 380 the content 120 to the client devices 180 at the determined rate.

Alternative Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by an online system, a plurality of content items from a content provider, the plurality of content items for delivery to users of the online system, and each content item displaying information about one of a product or service;
   receiving, from the content provider, a target return on spend value for the plurality of content items;
   receiving, by the online system, a data feed of the content provider system, the data feed comprising information about the products or services about which information is displayed in the content items;
   receiving, by the online system from the data feed of the content provider system, a weight associated with each of the products or services, wherein each weight is based on the received information about the product or service and is indicative of a value of the product or service to the content provider;
   delivering the plurality of content items to a plurality of users;
   determining, for each of the plurality of content items, the cost to the content provider of displaying each content item, the determination based on the delivery of the plurality of content items;
   monitoring a rate of user interactions associated with the plurality of content items for training a machine learning model to predict a likelihood of a user taking a desired action regarding the content item;
   providing, as input to the trained machine learning model, the target return on spend value, and factors associated with each of the plurality of content items, the factors including the weight of the product or service associated with the content item, the determined cost of displaying the content item to users through the online system, and the monitored rate at which users interact with the content item;
   applying the trained machine learning model to the provided input for determining, for each of the plurality of content items, a rate at which the content item is subsequently delivered to users, wherein the determined rates are optimized to provide the target return on spend for the content provider; and
   delivering the content items to users at the determined rates.

2. The computer-implemented method of claim 1, wherein delivering a content item to the users comprises:
   identifying a particular user;
   identifying a plurality of content items as potential candidate content items for delivery to the user, the plurality of content items comprising the content item;
   for each of the plurality of content items:
   identifying a particular product or service associated with the content item;
   determining a score based on the weight associated with the product or service and the rate at which users interact with the content item; and
   delivering the content item to the particular user, responsive to the score of the content item exceeding the scores of remaining content items from the plurality.

3. The computer-implemented method of claim 1, wherein the rate at which the content item is subsequently delivered to users is determined to be a value proportionate to the weight associated with the product or service and proportionate to the rate at which users interact with the content item.

4. The computer-implemented method of claim 1, wherein determining the rate at which the content item is subsequently delivered to users further comprises:
   determining a product of the weight associated with the product or service and the rate at which users interact with the content item.

5. The computer-implemented method of claim 1, wherein monitoring the rate of the user interactions associated with the content item comprises determining a number of times users interact with the content item in a particular time interval.

6. The computer-implemented method of claim 1, wherein monitoring the rate of the user interactions associated with the content item comprises:
   identifying a type of user interaction; and
   monitoring a rate at which users perform user actions of the identified type with the content item in response to receiving the content item; and
   determining a weighted aggregate based on the user interactions, wherein a user interaction is weighted based on the type of the user interaction.

7. The computer-implemented method of claim 1, wherein the weight associated with the product or service represents a value to the content provider of a conversion occurring on the item product or service.

8. The computer-implemented method of claim 1, wherein a user interaction associated with the content item represents a transaction related to the product or service associated with the content item.

9. The computer-implemented method of claim 1, wherein a user interaction associated with the content item represents registering with a website of a content provider of the content item.

10. The computer-implemented method of claim 1, wherein the target return on spend value is an aggregate of weights associated with each of the products or services associated with the content provider.

11. The computer-implemented method of claim 10, wherein the target return on spend value is inversely proportionate to a total cost to the content provider of displaying the content items.

12. A non-transitory computer readable storage medium storing instructions for:
   receiving, by an online system, a plurality of content items from a content provider, the plurality of content items for delivery to users of the online system, and each content item displaying information about one of a product or service;
   receiving, from the content provider, a target return on spend value for the plurality of content items;
   receiving, by the online system, a data feed of the content provider system, the data feed comprising information about the products or services about which information is displayed in the content items;

receiving, by the online system from the data feed of the content provider system, a weight associated with each of the products or services, wherein each weight is based on the received information about the product or service, and is indicative of a value of the product or service to the content provider;

delivering the plurality of content items to a plurality of users;

monitoring a rate of user interactions associated with the plurality of content items for training a machine learning model to predict a likelihood of a user taking a desired action regarding the content item;

providing, as input to the trained machine learning model, the target return on spend value, and factors associated with each of the plurality of content items, factors including the weight of the product or service associated with the content item, the determined cost of displaying the content item to users through the online system, and the monitored rate at which users interact with the content item;

applying the trained machine learning model to the provided input for determining, for each of the plurality of content items, a rate at which the content item is subsequently delivered to users, wherein the determined rates are optimized to provide the target return on spend for the content provider; and delivering the content items to users at the determined rates.

13. The non-transitory computer readable storage medium of claim 12, wherein instructions for delivering a content item to the users comprise instructions for:

identifying a particular user;

identifying a plurality of content items as potential candidate content items for delivery to user, the plurality of content items comprising the content item;

for each of the plurality of content items:

identifying a particular product or service associated with the content item;

determining a score based on the weight associated with the product or service and the rate at which users interact with the content item; and delivering the content item to the particular user, responsive to the score of the content item exceeding the scores of remaining content items from the plurality.

14. The non-transitory computer readable storage medium of claim 12, wherein the rate at which the content item is subsequently delivered to users is determined to be a value proportionate to the weight associated with the product or service and proportionate to the rate at which users interact with the content item.

15. The non-transitory computer readable storage medium of claim 12, wherein instructions for determining the rate at which the content item is subsequently delivered to users further comprise instructions for:

determining a product of the weight associated with the product or service and the rate at which users interact with the content item.

16. The non-transitory computer readable storage medium of claim 12, wherein monitoring the rate of the user interactions associated with the content item comprises determining a number of times users interact with the content item in a particular time interval.

17. The non-transitory computer readable storage medium of claim 12, wherein instructions for monitoring the rate of the user interactions associated with the content item comprise instructions for:

identifying a type of user interaction; and monitoring a rate at which users perform user actions of the identified type with the content item in response to receiving the content item; and determining a weighted aggregate based on the user interactions, wherein a user interaction is weighted based on the type of the user interaction.

18. The non-transitory computer readable storage medium of claim 12, wherein the weight associated with the product or service represents a value to the content provider of a conversion occurring on the product or service.

19. The non-transitory computer readable storage medium of claim 12, wherein a user interaction associated with the content item represents a transaction related to the product or service associated with the content item.

20. The non-transitory computer readable storage medium of claim 12, wherein a user interaction associated with the content item represents registering with a website of a content provider of the content item.

21. The non-transitory computer-readable storage medium of claim 12, wherein the target return on spend value is an aggregate of weights associated with each of the products or services associated with the content provider.

22. The non-transitory computer-readable storage medium of claim 21, wherein the target return on spend value is inversely proportionate to a total cost to the content provider of displaying the content items.

* * * * *